United States Patent [19]

Eggert, Jr.

[11] 3,944,271
[45] Mar. 16, 1976

[54] VEHICLE BUMPER

[76] Inventor: Walter S. Eggert, Jr., Huntingdon Valley, Pa.

[22] Filed: July 5, 1974

[21] Appl. No.: 486,269

[52] U.S. Cl................... 293/71 R; 293/85; 293/98
[51] Int. Cl.² ............................................ B60R 19/08
[58] Field of Search ............ 293/70, 71 R, 71 P, 88, 293/1, 60, 85, 87, 89, 98; 267/140, 141; 114/219; 213/221

[56] References Cited
UNITED STATES PATENTS

| | | | |
|---|---|---|---|
| 2,829,915 | 4/1958 | Claveau | 114/219 X |
| 2,954,256 | 9/1960 | Barenyi | 293/88 X |
| 3,493,257 | 2/1970 | Fitzgerald et al. | 293/71 R |
| 3,739,882 | 6/1973 | Schwenk et al. | 293/71 R |
| 3,744,835 | 7/1973 | Carbone et al. | 293/71 R X |
| 3,779,592 | 12/1973 | Golze et al. | 293/70 X |
| 3,804,395 | 4/1974 | Muller | 267/140 |
| 3,829,141 | 8/1974 | Igwe | 293/71 R |

FOREIGN PATENTS OR APPLICATIONS 353,289   7/1931   United Kingdom............... 293/71 R Primary Examiner—M. Henson Wood, Jr.
Assistant Examiner—Andres Kashnikow
Attorney, Agent, or Firm—Thomas I. Davenport

[57] ABSTRACT

Vehicle bumper having high yield strength and extensive movement under impact loads with full shape restoration, comprising a thin transversely curved high strength resilient front plate, a high strength resilient rear backing plate located at a distance behind the front plate and anchored to the vehicle, and an intermediate body of an elastomeric material between the front plate and the rear plate to absorb impacts, increase the yield distance and to assist in restoring the front plate to original shape, together with a soft yieldable front jacket with a scuff-resistant outer surface which covers the bumper and, if desired, adjacent parts of the front of the vehicle.

4 Claims, 6 Drawing Figures

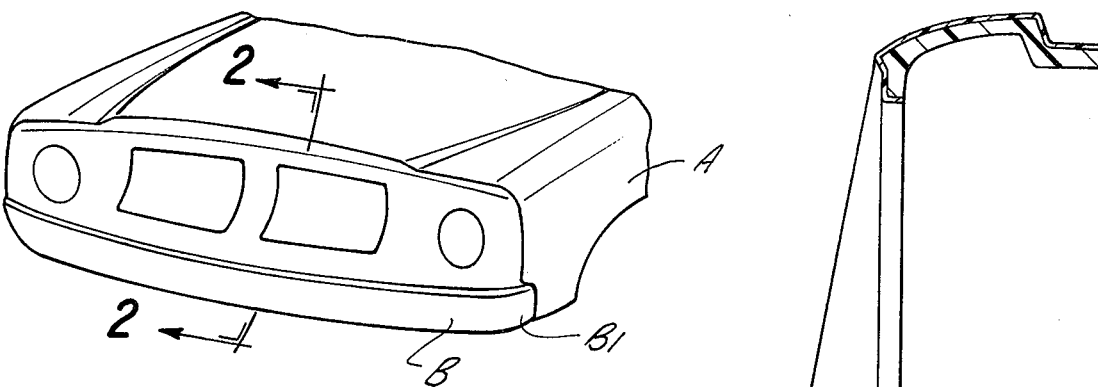
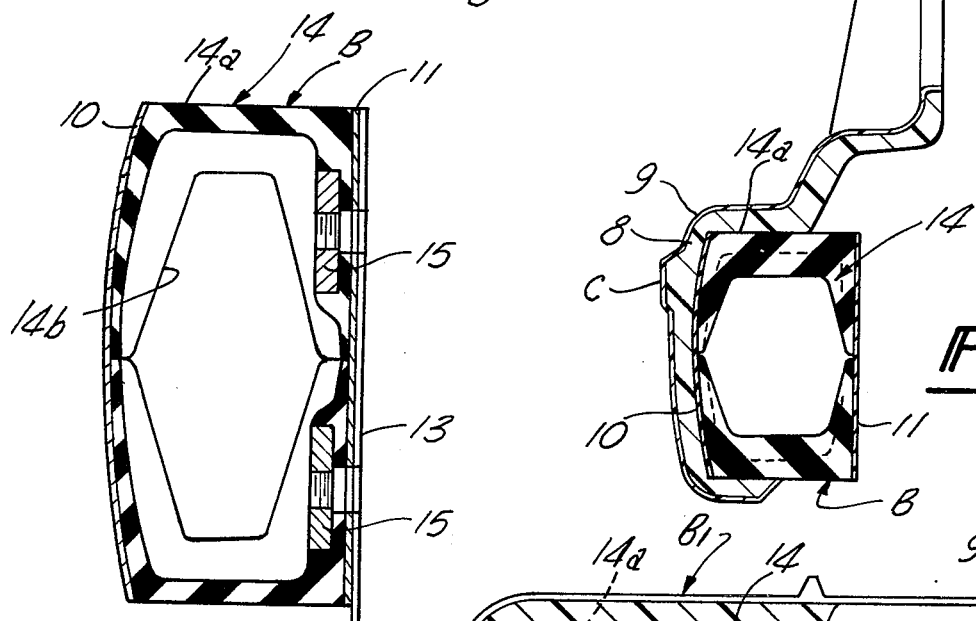
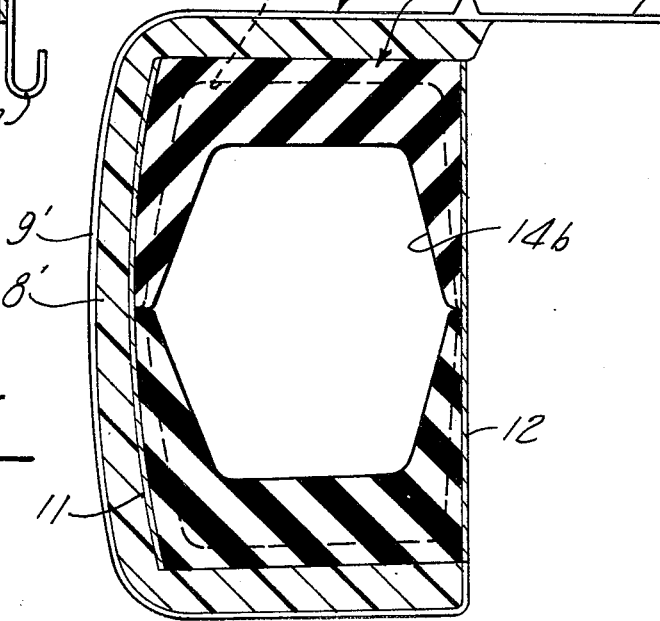

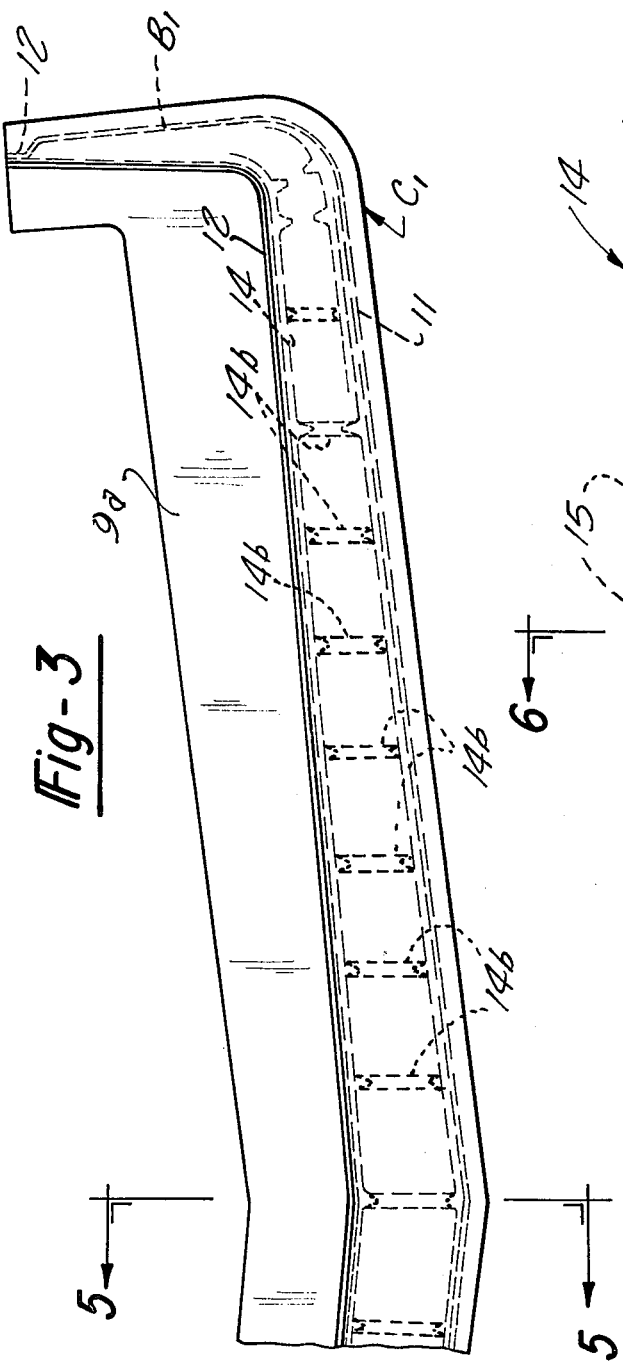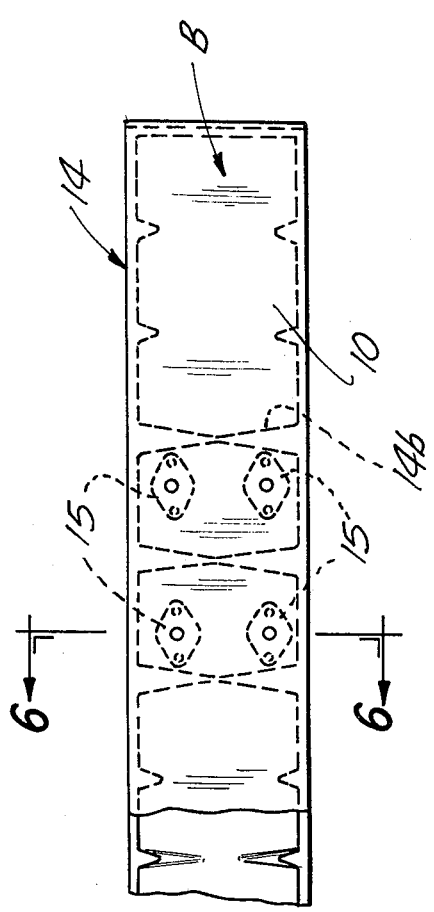

VEHICLE BUMPER

BACKGROUND

Many years ago vehicles were provided with bumpers which bend elastically and restore under low velocity impact loads, the bumpers usually comprising a single spring-like plate. These bumpers had limited utility.

Then came a long period when rigid bumpers were used, largely ornamental, and easily deformed under relatively light impact loads. Such bumpers afforded but little protection to the vehicle or its occupants and were expensive to replace. There were proposals to use pneumatic beams and various other forms of bumpers.

More recently there have been requirements that bumpers take low velocity impact loads, at least up to about five miles per hour, to protect the vehicle and its occupants while preserving the bumper system. The bumpers now commonly supplied to meet this requirement comprise a rigid bumper bar of hollow section backed by shock abosrbers, as of the reciprocable fluid piston-cylinder type. The bumper bar may have a maximum bending deformation before permanent yield of about ⅛ inch when a load of 20,000 pounds is applied. The shock abosrbers may provide a movement of about 2 inches at impact loads averaging about 20,000 pounds over this distance.

SYNOPSIS OF INVENTION

The present invention provides a composite bumper bar system which largely serves the prior function of both the rigid bar and the shock absorber system to provide a bending movement of 2 inches or more under collision impact loads without permanent deformation of the bumper bar or the soft protective jacket therefor; then, if the shock absorber system is retained in the bumper supports, as it may be, the additional movement of 2 inches or more is added to the yield movement and energy absorption provided by the improved bumper bar itself, totaling four inches or more altogether. It can readily be seen that an impact load of, say 20,000 pounds, acting through a distance of 2-plus inches will absorb many times more energy than the same load acting through a distance of ⅛ inch, as formerly.

This desirable improvement is provided by a composite bumper bar which comprises a thin transversely curved front plate of resilient spring-like high-strength material which can buckle locally under initial loading and restore to shape when the load is removed, a rear backing plate which is also bendable, and an intermediate yieldable shear web medium, as of an elastomeric material, such as urethane, rubbers, or the like, which, besides absorbing loads, will reduce the effective shear modulus of the beam and also aid in restoring the front plate to its original shape. Preferably, for lightness, the intermediate medium is made hollow or tubular instead of solid, and is provided with longitudinally spaced transverse wall elements which assist in maintaining the shape of the intermediate resilient elastomeric medium.

DRAWINGS

The objects of the invention, as well as various features of novelty and advantages, will be apparent from the following description of an exemplary embodiment thereof, reference being made to the accompanying drawings, wherein:

FIG. 1 is a front perspective view of an automotive vehicle, car or automobile, provided with a bumper system according to the present invention, the bumper and front of the car being covered by an ornamental scuff-resistant elastic jacket;

FIG. 2 is an enlarged vertical longitudinal section taken on the line 2—2 of FIG. 1;

FIG. 3 is a partial top plan view of an environmental arrangement for the bumper in which the bumper bar is separately covered by the soft ornamental jacket;

FIG. 4 is a partial front elevational view, with parts removed in places to show parts behind, of the assembly shown in FIG. 3;

FIG. 5 is a longitudinal vertical section taken on the line 5—5 of FIGS. 3 and 4;

FIG. 6 is a longitudinal vertical section taken on the line 6—6 of FIGS. 3 and 4.

SPECIFIC EMBODIMENT

FIG. 1 shows the front end portion of an automotive vehicle, car or automobile A having a bumper assembly or system B according to the present invention, together with a soft elastic decorative jacket C which covers the bumper and the front of the car above the bumper. The jacket C has a low-density elastomeric inner portion or layer 8 and an outer scuff-resistant portion or layer 9.

The bumper assembly B comprises a front plate 10 which is transversely curved in vertical section, being convex on the front side and concave on the rear side. The front plate is formed of thin resilient spring-like material such as a cold-rolled stretch-formed high-tensile steel. Thus formed, the front plate can buckle locally under initial collision impact loads and then will take further loading in longitudinally bent condition in tension. When the load is removed the front plate will spring back into longitudinally aligned transversely bent condition, that is, its original shape.

At a distance behind the front plate 10 there is rear backing plate 11 of like material as the front plate and also stretch-formed to shape. At the ends both plates are bent rearwardly in side portions B1 and are secured together at the rear ends 12 in any suitable way, as by rivets, welding or the like, not shown. The backing plate is also thin and may eventually bend longitudinally between support points but will serve its purpose if made flat, as shown, instead of being transversely curved, as is the front plate.

At support points of attachment to the car frame on each side, the rear plate 11 is strengthened by reinforcing plates 13, FIGS. 4 and 6, which may have elements 13a on the bottom for car jacking.

Between the plates 10 and 11 there is provided an intermediate shear web body or medium 14 of elastomeric material, such as urethane, a rubber, or the like, which yields under load, reduces the shear modulus of the beam, and restores to shape when the load is removed, assisting the front plate to return to its original shape. The intermediate medium 14 is preferably hollow or tubular for greater yield and lightness, with a main longitudinal outer wall 14a and with longitudinally spaced transversely extending wall elements 14b for strength and to prevent collapse. The intermediate medium 14 may be pre-formed as upper and lower half sections and has plates 10 and 11 secured to the front and rear faces in any suitable manner, as by vulcanizing, cementing or the like, depending on the type of elastomeric material used.

At support points threaded inserts 15 are provided and the rear plate 11 and the reinforcing plates 13 are provided with holes to take fastening screws.

In the environment shown in FIGS. 1 and 2 the jacket C extends over and is secured to the bumper and also extends over and is secured to the full front of the car except for necessary openings for radiator, lamps or other appurtenances where desired, and the portion above the bumper flexes when collision impact loads deform the bumper.

In the embodiment shown in FIGS. 3–6 the bumper itself is the same as before but the ornamental jacket C1 covers the bumper bar separately from the other parts of the front of the car, which may or may not be covered. The ornamental jacket has an inner low-density elastomeric layer 8', an outer scuff-resistant layer 9', and a rear extension 9a which extends rearwardly to cover the space between the bumper and car body shell, the rearward extension being painted or otherwise finished to match or complement the body finish.

The inner surface of the inner layer of the jacket may be secured to the outer surface of the bumper, as by cementing, vulcanizing, or the like; and if it extends over adjacent car surfaces it will likewise be secured to them.

Means, not shown, are provided for securing accessory members, such as fittings to prevent ride-over or ride-under of colliding cars, such attaching means being secured to the front plate 10 of the bumper and extending through the outer jacket.

While one embodiment of the invention in two different environments has been shown for purposes of illustration, it is to be understood that there may be various embodiments and modifications within the general scope of the invention.

I claim:

1. A vehicle bumper, comprising in combination, a thin resilient high-tensile longitudinal front plate, said front plate being transversely curved in vertical section, convex forwardly and concave rearwardly to buckle and bend longitudinally when a load exceeding a predetermined force is applied and to restore to its original shape when said load is removed, a thin resilient high-tensile rear place located at a distance behind the front plate, and an intermediate hollow body of elastomeric material disposed between and secured to the front and rear plates.

2. A vehicle bumper as set forth in claim 1, wherein the intermediate hollow body is provided with longitudinally spaced rigidifying wall elements.

3. A vehicle bumper as set forth in claim 2, which further includes a low-density elastomeric froam jacket covering the front and top of the bumper.

4. A vehicle bumper as set forth in claim 3, wherein the front and rear plates are stretch-formed of high-tensile cold-rolled steel and have rearwardly turned convergent portions secured together at their rear ends.

* * * * *